(12) United States Patent
Wood et al.

(10) Patent No.: US 9,187,036 B2
(45) Date of Patent: Nov. 17, 2015

(54) LANE GUIDE DEVICE FOR A DRIVER OF AN AUTOMOBILE

(71) Applicants: Gregory Wood, Miami, FL (US); Alejandro Casado, Venice, CA (US)

(72) Inventors: Gregory Wood, Miami, FL (US); Alejandro Casado, Venice, CA (US)

( * ) Notice: Subject to any disclaimer, the term of this patent is extended or adjusted under 35 U.S.C. 154(b) by 199 days.

(21) Appl. No.: 13/942,735

(22) Filed: Jul. 16, 2013

(65) Prior Publication Data

US 2015/0023035 A1    Jan. 22, 2015

(51) Int. Cl.
| | |
|---|---|
| *B60Q 1/00* | (2006.01) |
| *B60Q 9/00* | (2006.01) |
| *B60Q 3/00* | (2006.01) |
| *G01B 5/00* | (2006.01) |

(52) U.S. Cl.
CPC .............. *B60Q 9/008* (2013.01); *B60Q 3/007* (2013.01); *G01B 5/00* (2013.01)

(58) Field of Classification Search
CPC ........... G01B 5/00; B60Q 9/008; B60Q 3/007
USPC .................................................... 33/264, 288
See application file for complete search history.

(56) References Cited

U.S. PATENT DOCUMENTS

| | | | | |
|---|---|---|---|---|
| 1,610,477 | A * | 12/1926 | Sanford ............................ | 33/264 |
| 1,871,532 | A * | 8/1932 | Dudley ............................ | 33/264 |
| 3,199,487 | A * | 8/1965 | Heinkel ........................ | 116/28 R |
| 3,834,036 | A * | 9/1974 | Scarritt, Sr. ............ | B62D 15/00 33/264 |
| 4,016,653 | A * | 4/1977 | Bartlett ............................ | 33/264 |
| 4,079,519 | A * | 3/1978 | Carmouche ....................... | 33/264 |
| 4,852,901 | A * | 8/1989 | Beasley et al. ................. | 280/477 |
| 5,052,113 | A * | 10/1991 | Aquino ...................... | B60R 1/00 116/28 R |
| 5,729,194 | A * | 3/1998 | Spears et al. .................... | 340/431 |
| 6,198,386 | B1 * | 3/2001 | White, II ........................ | 340/435 |
| 6,688,007 | B2 * | 2/2004 | Ferron ................... | B62D 15/02 116/28 R |
| 7,043,342 | B1 * | 5/2006 | Dewees ............................ | 701/1 |
| 7,650,698 | B2 * | 1/2010 | Stewart, III ..................... | 33/264 |
| 8,590,167 | B2 * | 11/2013 | Odom ............................. | 33/228 |
| 8,893,641 | B1 * | 11/2014 | Hagel ......................... | 116/28 R |
| 2003/0019117 | A1 * | 1/2003 | Hoholik .......................... | 33/264 |
| 2004/0052076 | A1 * | 3/2004 | Mueller et al. ................. | 362/293 |
| 2005/0128751 | A1 * | 6/2005 | Roberge et al. ............... | 362/276 |
| 2006/0002110 | A1 * | 1/2006 | Dowling et al. .............. | 362/252 |
| 2008/0049439 | A1 * | 2/2008 | Wang ................... | B60Q 1/2696 362/542 |
| 2010/0201309 | A1 * | 8/2010 | Meek ............................ | 320/108 |

* cited by examiner

*Primary Examiner* — Mary McManmon
(74) *Attorney, Agent, or Firm* — Mark Terry

(57) ABSTRACT

An automotive safety device, specifically, an automobile safety device that assists drivers to remain in their proper driving lane when driving a moving vehicle. One embodiment of the present invention can include a flat planar body member, a plurality of light emitting members connected to the planar body member, wherein the light emitting members are configured in a predetermined arrangement, a power source electronically connected to the light emitting members, and a selectively engageable dimmer switch electronically connected to the power source and the light emitting members. The plurality of light emitting members can be configured in an angled position such that when the planar body member is positioned on the dashboard of a motor vehicle, between a steering wheel and a windshield of the motor vehicle, the reflection of the light emitting members appears to project outwardly in a straight line in front of the windshield.

17 Claims, 4 Drawing Sheets

LANE GUIDE DEVICE FOR A DRIVER OF AN AUTOMOBILE

CROSS REFERENCE TO RELATED APPLICATIONS (Not Applicable).

STATEMENT REGARDING FEDERALLY SPONSORED RESEARCH OR DEVELOPMENT (Not Applicable).

THE NAMES OF THE PARTIES TO A JOINT RESEARCH AGREEMENT (Not Applicable).

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC (Not Applicable).

BACKGROUND OF THE INVENTION

Field of Invention

The present invention relates to the field of automotive safety devices, specifically, automobile safety devices that assist drivers to remain in their proper driving lane when driving a moving vehicle.

According to the National Sleep Foundation's 2005 *Sleep in America* poll, 60% of adult drivers, about 168 million people, say they have driven a vehicle while feeling drowsy in the past year, and more than one-third, (37% or 103 million people), have actually fallen asleep at the wheel. In fact, of those who have fallen asleep while driving, 13% say they have done so at least once a month. Four percent, approximately eleven million drivers, admit they have had an accident or near accident because they dozed off or were too tired to drive.

The National Highway Traffic Safety Administration conservatively estimates that 100,000 police-reported crashes are the direct result of driver fatigue each year. This results in an estimated 1,550 deaths, 71,000 injuries, and $12.5 billion in monetary losses. These figures may be the tip of the iceberg, since currently it is difficult to attribute crashes to sleepiness.

Studies show that the main cause for drowsy driving is the stress placed on the driver's eyes from the concentrating on staying in the correct lane while driving. Highway lane markers are made of reflective materials that reflect the beams of light emitted from the vehicle's headlights directly towards the driver's eyes so that the driver can see the highway lane markers at night. While the reflectors allow for the driver to see the highway lane markers at night, they also cause significant strain on the driver's eyes and cause the driver to squint while driving at night.

When driving for extended periods of time, over 45 minutes at a time, the strain on the driver's eyes, resulting from constant squinting, often make drivers want to rest or relax their eyes resulting in drowsy driving.

One of the major sources of strain on the driver's eyes is from squinting or otherwise straining the driver's eyes to stay in the proper lane while driving.

In order to address this need, the inventors have invented the present invention, specifically, a lane guidance device comprising essentially of a self-securing mat body, two angled LED light strips, a dimmer switch, and a power source.

An objective of the present invention is to provide a lane guidance device that assists a driver of a motor vehicle to remain in their proper driving lane.

Another objective of the present invention is to provide a lane guidance system that can be retrofitted into existing motor vehicles.

Yet another objective of the present invention is to provide a lane guidance system that projects a guide in the field of view of the driver.

Still another objective of the present invention is to provide a lane guidance system that projects a guide in the field of view of the driver that can be customized to the driver's preferences.

Information relevant to attempts to address these objectives can be found in previous attempts to address the foregoing problem specifically U.S. Pat. No. 3,834,036, U.S. Pat. No. 5,052,113, and U.S. Pat. No. 6,688,007. However, each of the foregoing references suffers from one or more of the following disadvantages: the referenced device must be affixed to the driver's windshield, do not accommodate the modern angled windshield, have limited functionality in inclement or low light weather, and they are not adjustable to the individual user's preferences.

In light of the above, it would be beneficial to have a device that reduces the strain on a driver's eyes while assisting the driver to remain in their proper driving lane when driving a moving vehicle.

SUMMARY OF THE INVENTION

The present invention is directed towards an automotive safety device, specifically, an automobile safety device that assists drivers to remain in their proper driving lane when driving a moving vehicle. One embodiment of the present invention can include a flat planar body member, a plurality of light emitting members connected to the planar body member, wherein the light emitting members are configured in a predetermined arrangement, a power source electronically connected to the light emitting members, and a selectively engageable dimmer switch electronically connected to the power source and the light emitting members. The plurality of light emitting members can be configured in an angled position such that when the planar body member is positioned on the dashboard of a motor vehicle, between a steering wheel and a windshield of the motor vehicle, the reflection of the light emitting members appears to project outwardly in a straight line in front of the windshield.

Another embodiment of the present invention can include a solar panel electronically connected to the power source so that the device invention can recharge when placed in the path of sunlight.

Another embodiment of the present invention can include adjustable light emitting members so that the device can accommodate variously sloped windshields and various makes and models of automobiles.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
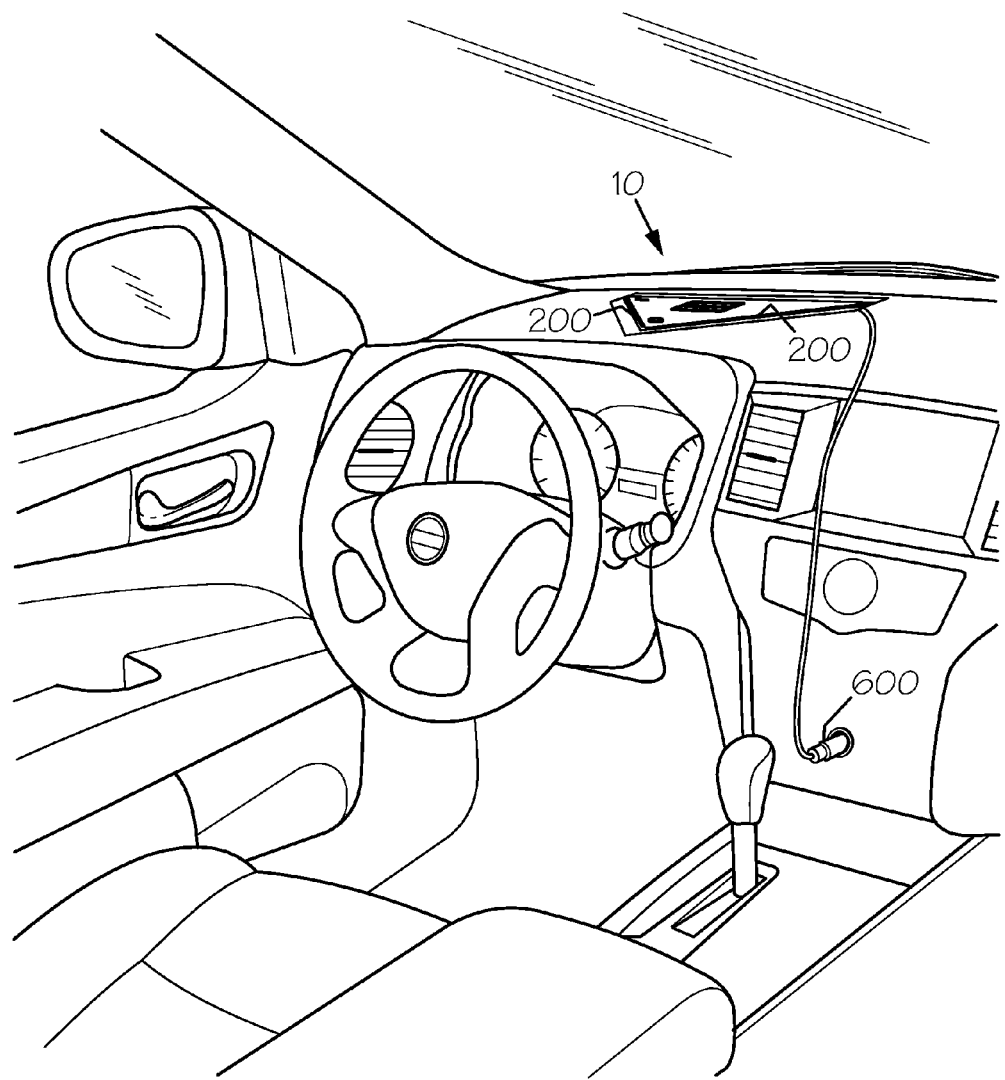
FIG. 1 is a perspective view of the device positioned on the dashboard of a vehicle that is useful for understanding the inventive concepts disclosed herein.

For purposes of this description, the terms "upper," "bottom," "right," "left," "front," "vertical," "horizontal," and derivatives thereof shall relate to the invention as oriented in FIG. 1.

The present invention is directed towards an automotive safety device, specifically, an automobile safety device that assists drivers to remain in their proper driving lane when driving a moving vehicle.

Figure 2:
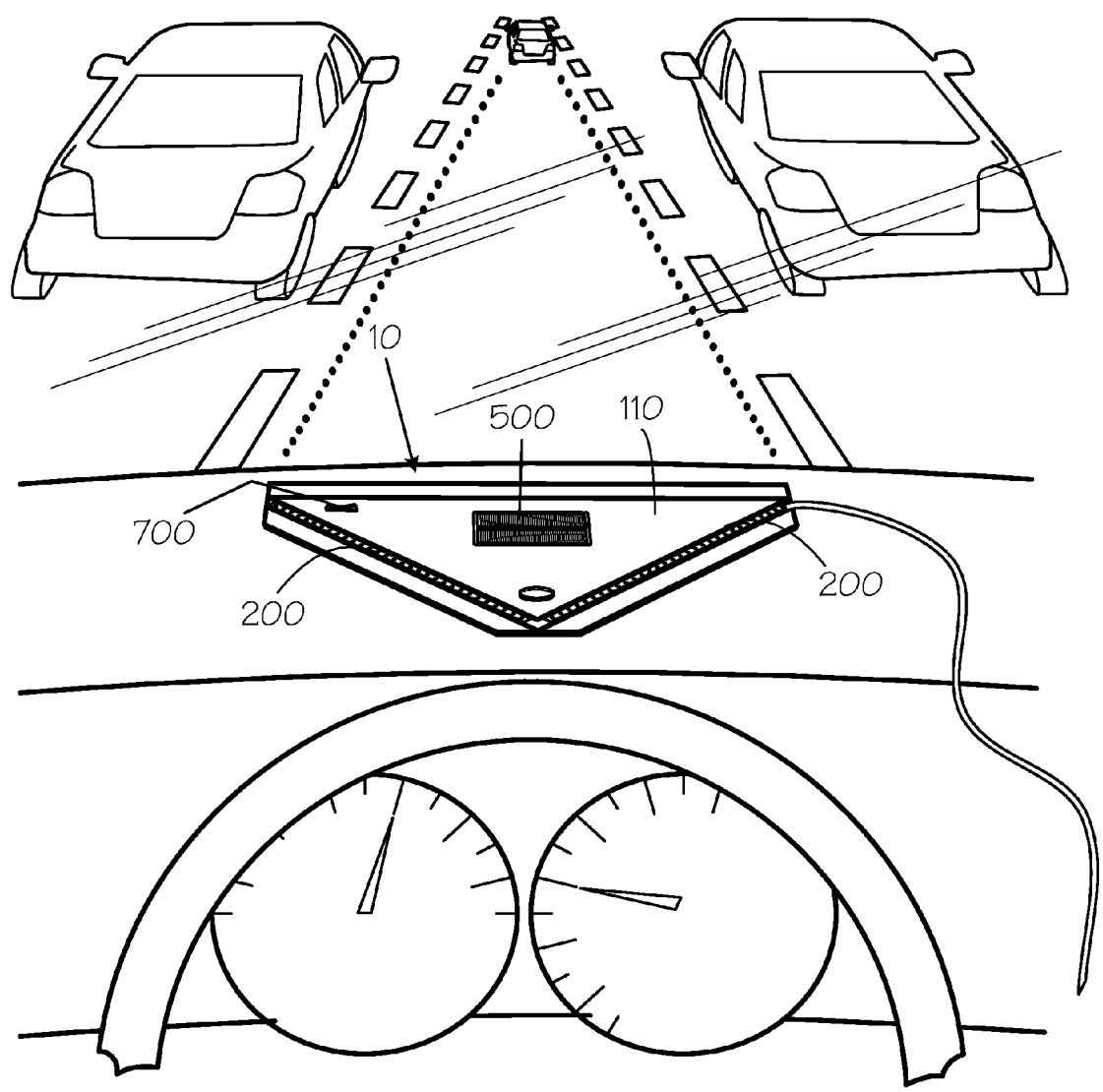
FIG. 2 is a perspective view of the device positioned on the dashboard of a vehicle in operation demonstrating the guide lines projected from the driver's perspective.

FIGS. 1 and 2 illustrate one embodiment of the device 10 as positioned upon the dashboard of a motor vehicle, which is useful for understanding the inventive concepts described herein. As shown, the device 10, according to one embodiment, can include a flat planar body member 100, wherein the flat planar body member 100 includes a top surface 110 and bottom surface 120, a plurality of light emitting members 200 connected to the top surface of the planar body member 100, where in the light emitting members 200 are configured in a predetermined arrangement, a power source 300 electronically connected to the light emitting members 200, and a selectively engageable dimmer switch 400 electronically connected to the power source 300 and the light emitting members 200.

As described herein, the flat planar body member 100, may be substantially triangular or trapezoidal in shape. While the dimensions of the flat planar body member 100 are not critical, in the preferred embodiment, the flat planar body member 100 can have a length about its horizontal axis of about 24 inches. Of course any number of shapes and dimensions are also contemplated. In one embodiment, it is envisioned that the flat planar body member 100 may be composed of a rubber or a rubber composite material, although other semi-malleable materials may also be used.

Figures 6A, 6B, 6C:
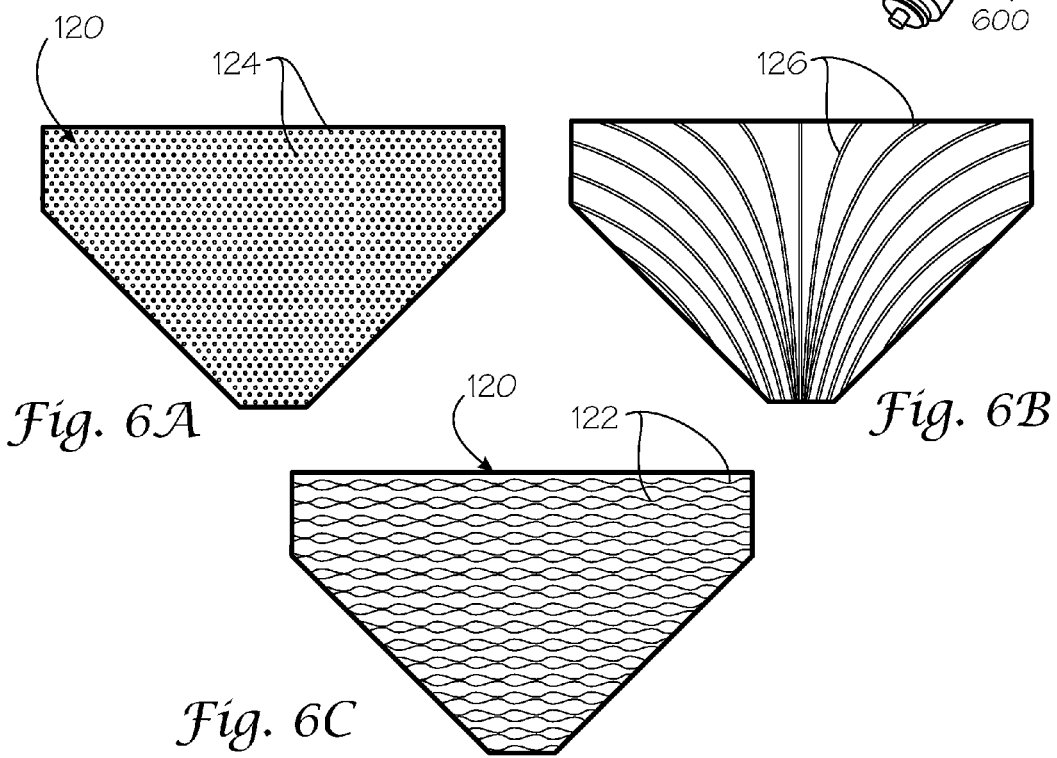
FIGS. 6A-C are bottom plan views of alternative embodiments of the invention with various gripping means of the device.

FIGS. 6A-C illustrate various bottom plan views of the bottom surface 120 of the flat planar body member 100 of the device 10. As shown in FIGS. 6A-C, the bottom surface 120 may also include alternative gripping means for securing the device 10 to the dashboard of a motor vehicle. It is contemplated that the gripping means may be in the form of horizontal channels 122, protrusions or divots 124, angular channels 126, or any combination thereof.

As seen in FIG. 1 and FIG. 2 the plurality of light emitting members 200 are connected to the top surface 110 of the flat planar body member 100 and configured in a predetermined arrangement. In order to adjust the brightness of the light emitting members 200, it is envisioned that the device 10 may also include a selectively engageable dimmer switch 400 electronically connected to the power source 300 and the light emitting members 200. In one embodiment, the device 10 may also include a remote dimming device (not pictured) wherein the user can adjust the brightness of the light emitting members 200 remotely using a key chain remote (not pictured).

In a preferred embodiment, the light emitting members 200 are configured in an angled arrangement such that when the planar body member 100 is positioned on the dashboard of a motor vehicle, between a steering wheel and a windshield of the motor vehicle, the reflection of the light emitting members 200 appears to project outwardly in a straight line in front of the windshield of the motor vehicle. In order to achieve the outward projection, the device 10 must be positioned in an angled arrangement such that the light emitting members 200 are in a two rowed angled formation whereby the light emitting members 200 are angled towards each other in a substantially "v" shaped configuration and the narrow portion of the "v" shape is closest to the driver and the wide portion of the "v" shape is closest to the windshield.

The light emitting members 200 may be light emitting diodes (LED) lights, traditional filament light bulbs, hydrogen light bulbs, florescent light bulbs or other light emitting devices that are known in the art. In the preferred embodiment, the light emitting members 200 may be arranged in a single line formation with each light emitting member 200 being equally spaced from one and another; however, any number of other spatial arrangements and configurations are also contemplated. In an alternative embodiment, the light emitting members 200 may be solid strips of single light emitting members without any spaces between the lights. In the preferred embodiment it is envisioned that the light emitting members 200 will emit a blue light; however, any color light is also contemplated. In an alternative embodiment, the color of the light may be selected by the user from a range of possible light colors. Alternative embodiments may include add-on features where the user can select from a predetermined set of colored covers so that the light emitting members 200 emit a color that is most effective for the user.

It is further envisioned that one embodiment of the device 10, may include an arrangement of light emitting members 200 wherein the color combination and arrangement of colors of the light emitting members 200 correspond to a predetermined necessary safe stopping distance for the motor vehicle based on predetermined parameters including, weight, size of the vehicle, and speed of the vehicle. By way of example, it is envisioned that the driver of a moving motor vehicle with the device 10 installed therein, may have a reflection with green, yellow, and red wherein the green portion corresponds to a safe stopping distance based on the predetermined calculation, the yellow portion may correspond to a questionably safe stopping distance, and the red portion might correspond to a dangerously close distance that should be avoided. Of course the choice of green, yellow, and red color combinations are just for example and any number of colors and combinations thereof are also contemplated and envisioned.

In one embodiment, the light emitting members 200 may be removably attachable or pivotally attachable to be reconfigured to the flat planar member body 100 as to adapt to the various sizes and angles of windshield found in the different makes and models of motor vehicles on the market.

Figure 3:
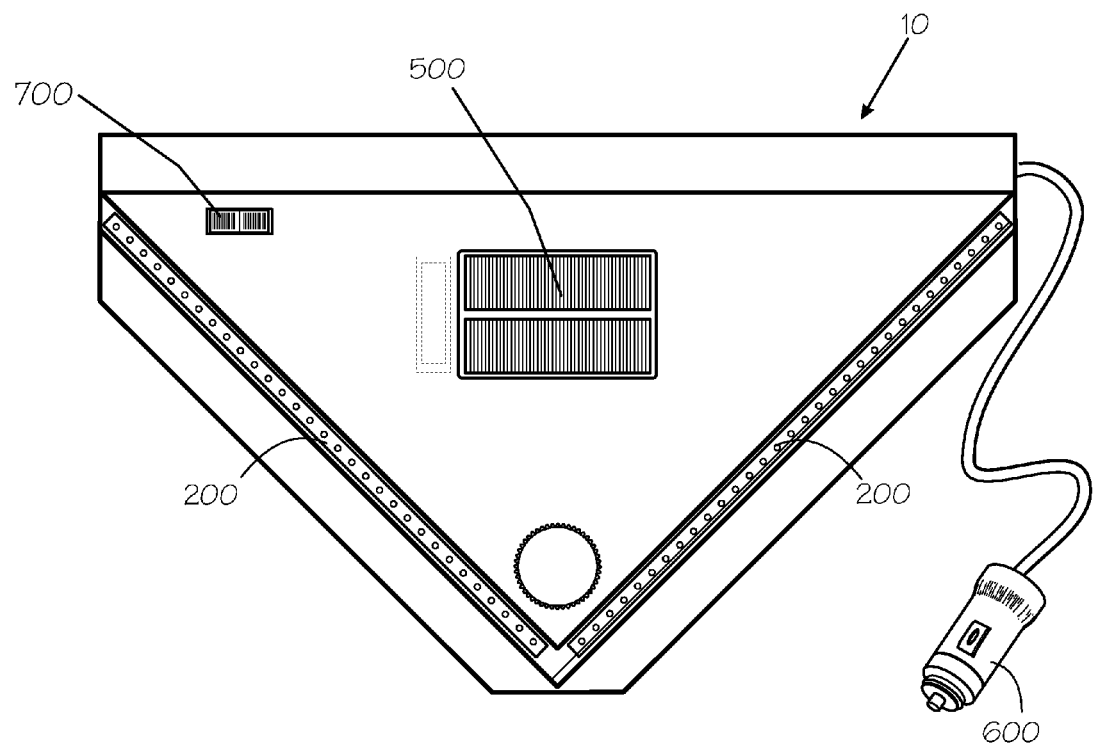
FIG. 3 is a top plan view of the device.
Figure 4:
FIG. 4 is a side elevation view of the device.
Figure 5:
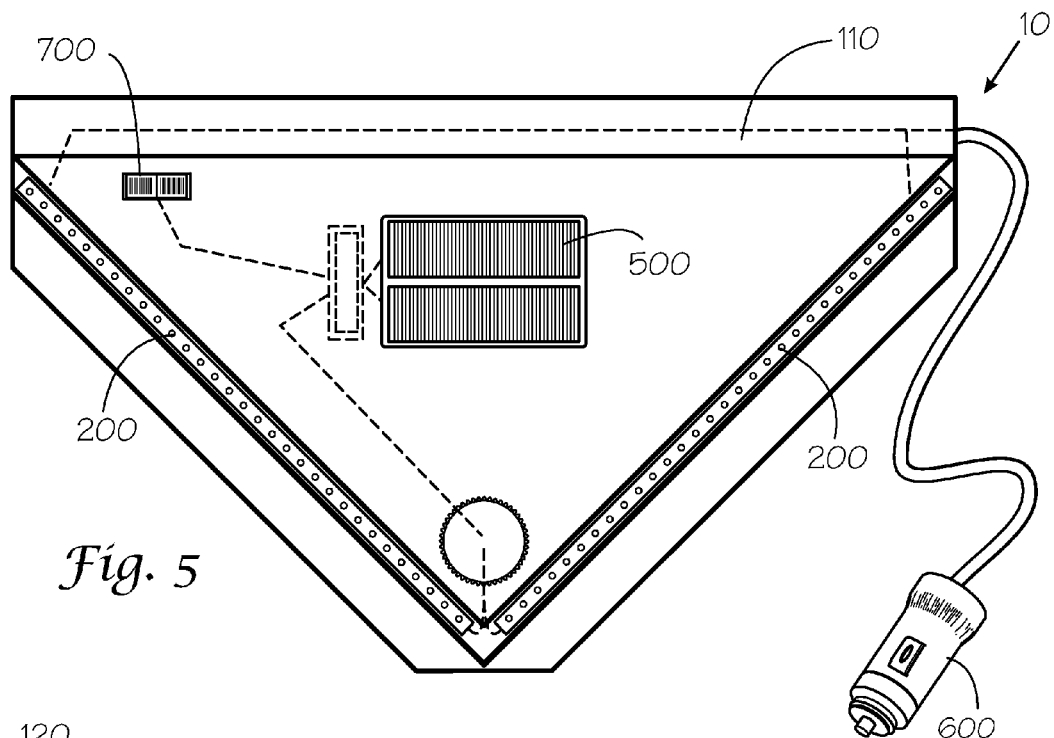
FIG. 5 is top plan view of the device showing the internal circuitry of one embodiment of the device.

Referring back to FIG. 3, the device 10 also include a power source 300 electronically connected to the light emitting members 200. The power source 300 can be a traditional DC battery or it can be a rechargeable DC battery (power storage unit), the specifications of the battery are not critical; however, it must be capable of powering the plurality of light emitting members 200. Of course, the larger the capacity of the power source, the longer it will be able to power the light emitting members 200 without being recharged or replaced.

In a preferred embodiment, the device 10 may also include a solar panel 500 electronically connected to the power source 300. Again, the specifications of the solar panel 500 are not critical; however the larger the surface area of the solar panel 500, the more solar power will likely be generated. In one embodiment, the device 10 may also include a DC power adapter 600 electronically connected to the power source 300 or the power storage unit. It is envisioned that the DC power adapter 600 may be the traditional 12V adapter that fits into the automobile receptacle commonly referred to as the cigarette lighter, although it is also envisioned that the DC power adapter may be an adapter that engages a Universal Serial Bus (USB) as many motor vehicles are being equipped with such USB ports. The specifications of the DC power adapter are not critical and many variations and combinations of voltages and wattages are contemplated. It is further envisioned that the device 10 may also include a selectively engageable switch 700 in electrical communication with the solar panel 500, the DC power adapter 600, and the other components of the device 10 so that the user can select between DC power and solar power. The selectively engageable switch 700 may be a toggle switch, a push button switch, a rotatably selective switch, or other similar switch technology that is currently known in the art.

As described herein, the various components are electronically connected using circuitry that is currently known in the art and one of ordinary level of skill in the art would recognize that the circuits could be configured in series or parallel configurations. Although the FIGS. as referenced and described herein, illustrate a closed device 10 wherein the circuitry is hidden from sight within the flat planar body member 100, one skilled in the art would recognize that the device 10 could also be constructed with an exposed circuitry without affecting the functionality of the device 10.

In operation, the device 10 is placed on the dash board of a motor vehicle in between the windshield and the steering wheel of the motor vehicle. The device 10 is positioned such that the narrow portion of the "v" formed by the angled light emitting members 200 is closest to the driver and the wider portion of the "v" formed by the angled light emitting members 200 is closest to the windshield.

Using certain embodiments of the device 10, the DC power adapter 600 may need to be engaged with the DC power receptacle of the motor vehicle; other embodiments of the device 10 may be operational using only the power sources contained in the device 10.

Minor adjustments may be made to position the device 10 such that when the light emitting members 200 are illuminated, a reflection is produced on the windshield of the motor vehicle that give the impression that the line of light created by the light emitting members 200 projects outward from the windshield and provides the user with two visual lane markers that correspond to the width of the drivers actual driving lane.

The user can adjust the brightness of the light emitted from the light emitting members using the selectively engageable dimmer switch 400. Once the desired brightness has been selected, the user will have a set of lane markers projected in front of them that will reduce the strain typically associated with driving at night.

When the driver has reached their destination, the device 10 may be removed from the dashboard of the motor vehicle or it may be left in place so that it may recharge itself when the sun is present.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An automobile safety device that assists drivers to remain in their proper driving lane when driving a moving automobile, said device comprising:
   a flat planar body member, having a top surface and a bottom surface having surface contours for gripping a surface of a dashboard of the automobile;
   a plurality of light emitting members connected to the top surface of the planar body member, wherein the light emitting members are configured in a V-shape having an apex at a distal end, such that the light emitting members are configured to produce reflections on a windshield of the automobile when the device is placed on the dashboard, such that said reflections on the windshield correspond to the proper driving lane when viewed through the windshield;
   a power source electronically connected to the light emitting members; and
   a selectively engageable dimmer switch electronically connected to the power source and the light emitting members.

2. The device of claim 1, further comprising a solar panel electronically connected to the power source.

3. The device of claim 1, further comprising a DC power car charger adapter.

4. The device of claim 1, further comprising a selectively engageable switch electronically connected to the solar panel, the DC power adapter and the other components of the device, configured such that a user can select between solar power or DC power to power the device.

5. The device of claim 1 wherein the bottom surface of the planar body member further comprises surface contours having grooves for gripping the dashboard.

6. The device of claim 1, wherein the plurality of light emitting members comprise light emitting diodes.

7. The device of claim 1, wherein the planar body is substantially trapezoidal in shape.

8. The device of claim 1, wherein the planar body is composed of a rubber material.

9. The device of claim 1, further comprising a Universal Serial Bus (USB) adapter.

10. The device of claim 1, wherein the plurality of light emitting members can be arranged into a plurality of arrangements.

11. The device of claim 1, wherein the plurality of light emitting members have a plurality of colors.

12. The device of claim 11, wherein the plurality of colors correspond to predetermined safe stopping distance for the motor vehicle with the device installed therein.

13. The device of claim 1, wherein the plurality of light emitting members are positioned on strips that can be can arranged in a plurality of positions.

14. The device of claim 1, wherein the plurality of light emitting members are positions on strips that are pivotally attached to the flat planar body such that they can be rotatably adjusted to accommodate varying angles.

15. The device of claim 1, further comprising a power storage unit.

16. The device of claim 15, wherein the power storage unit is a rechargeable battery.

17. A system that assists drivers to remain in their proper driving lane when driving an automobile, said system comprising:

an automobile including a dashboard and a windshield; and a safety device comprising:

a flat planar body member, having a top surface and a bottom surface having surface contours for gripping a surface of the dashboard of the automobile;

a plurality of light emitting members connected to the top surface of the planar body member, wherein the light emitting members are configured in a V-shape having an apex at a distal end, such that the light emitting members are configured to produce reflections on the windshield of the automobile when the device is placed on the dashboard, such that said reflections on the windshield correspond to the proper driving lane when viewed through the windshield;

a power source electronically connected to the light emitting members; and a selectively engageable dimmer switch electronically connected to the power source and the light emitting members.

* * * * *